United States Patent [19]
Takahashi

[11] Patent Number: 5,519,702
[45] Date of Patent: May 21, 1996

[54] DIGITAL COMMUNICATION SYSTEM

[75] Inventor: Hideaki Takahashi, Tokyo, Japan

[73] Assignee: NEC Corporation, Tokyo, Japan

[21] Appl. No.: 334,063

[22] Filed: Nov. 4, 1994

[30]    Foreign Application Priority Data

Nov. 4, 1993 [JP] Japan .................................. 5-275230

[51] Int. Cl.$^6$ ........................................................ H04J 3/22
[52] U.S. Cl. ........................... 370/84; 370/110.1; 370/112
[58] Field of Search .................................. 370/110.1, 84, 370/112, 68, 58.1

[56]            References Cited

U.S. PATENT DOCUMENTS

| | | | |
|---|---|---|---|
| 4,805,165 | 2/1989 | Kawamura et al. | 370/84 |
| 5,086,424 | 2/1992 | Motohashi et al. | 370/112 |
| 5,287,350 | 2/1994 | Ito et al. | 370/66 |
| 5,301,190 | 4/1994 | Tsukuda et al. | 370/68 |

FOREIGN PATENT DOCUMENTS 63-215132  9/1988  Japan .

*Primary Examiner*—Benedict V. Safourek
*Assistant Examiner*—Ajit Patel
*Attorney, Agent, or Firm*—Foley & Lardner

[57]            ABSTRACT

A digital communication system between different communication networks having different data transfer mode respectively is provided. In a base station of a mobile radio communication network uses four data channels whose data transfer speed is 32 kbps. The base station is connected to a switching center for communication with a public fixed communication network by an ISDN subscriber's line which has a basic rate access interface capability of carrying 2B+D data. Four channels of data having a data transfer speed 32 kbps from the mobile radio communication network are multiplexed into two channels of data having a data transfer speed 64 kbps to be carried by the 2B+D of the ISDN basic rate access interface. On the other hand, two channels of data having a data transfer speed 64 kbps carried by the ISDN basic rate access interface from the public fixed communication network are demultiplexed into four channels of data having a data transfer speed 32 kbps to be transferred to the mobile radio communication network.

5 Claims, 12 Drawing Sheets

DIGITAL COMMUNICATION SYSTEM

BACKGROUND OF THE INVENTION

I. Field of the Invention

This invention relates to a digital communication system. In particular, it relates to a transfer mode conversion technique between communication systems having different transfer speeds with respect to each other.

II. Description of the related art

The examples of prior art are described referring to FIGS. 1, 2 and 3. FIG. 1 is a schematic diagram showing a connection of the circuit between a digital communication system (hereinafter referred to as "PHS: personal handy phone system") network 100 using 4 channel speech circuit by 32kbps ADPCM (adaptive differential pulse-code modulation) in a radio zone and a public fixed communication network 200 constituted of ISDN (integrated services digital network).

Numeral 1 depicts a terminal device of the PHS system, and 2 depicts a base station for performing communication with the terminal device 1 by radio channels. The base station 2 is connected to a switching center 3 through a 2B+D circuit which includes two B-channels with a transfer speed of 64 kbps and one D-channel with a transfer speed of 16 kbps that is a basic rate access interface of a user-network interface of ISDN.

Numeral 4 depicts another switching center constituting the public fixed communication network 200 by ISDN together with the switching center 3.

FIG. 2 is an illustrative view showing operation of the base station of the example of prior art.

A speech channel 6 of 32 kbps ADPCM of the terminal device 1 is connected to the 2B+D circuit 5 of the ISDN user-network interface of the switching center 3, and to achieve connection status as shown in FIG. 2, where the control proceeds to receive a speech data transferred in a radio zone with TDMA/TDD by a transmitting/receiving equipment 21, to separate the data at every speech channel basis, and to take out 32 kbps ADPCM data respectively as B'1, B'2, B'3 and B'4.

Thus taken out data are respectively converted into 64 kbps PCM data B1 to B4 through the PCM converters 22 (PCM converter No. 0 to No. 3) which convert 32 kbps ADPCM to 64 kbps PCM. These data are grouped into two set of groups (for example, a set of B1 and B2, and a set of B3 and B4) in order to being transferred on two B-channels of subscriber's line having the 2B+ D structure, and are delivered to S interfaces 23 (S interface No. 0 and No. 1). On the other hand, a call from switching center 3 travels through a reverse route from the S interface 23, and is connected to a radio channel through the PCM converters 22 which convert 64 kbps PCM to 32 kbps ADPCM. FIG. 3 shows more detailed configuration of the one of the PCM converters 22. The 32 kbps ADPCM data transferred from the transmitting/receiving equipment 21 is once stored in the T (Transmitting: the data flow from a terminal device to a switching center) side register A 221, the data is converted to 64 kbps PCM by the PCM converter 222 and the converted data is stored in the T side register B 223. The stored data in the T side register B 223 is then output to the S interface 23.

The similar procedures are taken for the data flowing from the S interface 23 to the transmitting/receiving equipment 21 using the R (Receiving: the data flow from a switching center to a terminal device) side register B 224, the PCM converter 225 which converts 64 kbps PCM to 32 kbps ADPCM and the R side register A 226.

The ISDN subscriber's line interface has a transfer capability of 64 kbps in a B channel. In contrast to this, a transfer capability of a channel in the PHS system is only 32 kbps. Therefore, the conventional data transfer technique which requires conversion of transfer speed between 64 kbps and 32 kbps cannot achieve an effective utilization of the B channel.

It is required four sets each of PCM converters corresponding to four speech channels, e.g. four sets for converting 32 kbps ADPCM to 64 kbps PCM and another four sets for converting 64 kbps PCM to 32 kbps ADPCM in the base station, and it causes equipment of the base station to be a larger size.

It is expected in the future technical trend of the PHS system that the radio channel will become a half rate (16 kbps) or a quarter rate (8 kbps), and it means that the number of speech channels, including the subscriber's lines between the base station and the switching center, comes twice as many time the half rate is realized. Therefore, expenses of capital investment for new installations of the subscriber's lines will become a great amount.

SUMMARY OF THE INVENTION

The present invention has been made in view of the background described. An object of the invention is to provide a multiplexer/demultiplexer capable of transferring data in the amount corresponding to four speech channel of 32 kbps in using two B-channels of ISDN subscriber line interface.

The invention is to provide a digital communication system for converting a certain data transfer speed to a different data transfer speed, comprising;

a subscriber's cable having a basic rate access interface capability of an ISDN user-network interface in which two B type channels of a transfer speed 64 kbps are contained, a multiplexing means containing a pair of multiplexers for multiplexing two data channels of a transfer speed 32 kbps into one data channel of a transfer speed 64 kbps by each of said multiplexers, connected to one end of said subscriber's cable through a first S interface circuit having an ISDN S interface capability, and outputs two data channels of a transfer speed 64 kbps multiplexed by a pair of said multiplexers to said subscriber's cable; and a demultiplexing means connected to another one end of said subscriber's cable through a second S interface circuit having an ISDN S interface capability to input two data channels of a transfer speed 64 kbps, containing a pair of demultiplexers for demultiplexing one of said two data channels of a transfer speed 64 kbps into two data channels of a transfer speed 32 kbps by each of said demultiplexers, and outputs four data channels of a transfer speed 32 kbps demultiplexed by a pair of said demultiplexers.

A data channel of a transfer speed 32 kbps transfers the adaptive differential pulse code modulation (ADPCM) signals.

The invention is also to provide a digital communication system for converting a certain data transfer speed to a different data transfer speed, comprising;

a base station; a plurality of mobile terminal devices connected to said base station by radio channels of a transfer speed 32 kbps; and a switching device connected to said base station by a plurality of subscriber's cables having a basic rate access interface capability of an ISDN user-network interface in which two B type channels of a transfer speed 64 kbps are contained, wherein;

said base station, comprising;

a multiplexing means containing a pair of multiplexers for multiplexing two data channels of the up stream data from said mobile terminal devices of a transfer speed 32 kbps into one data channel of a transfer speed 64 kbps by each of said multiplexers, connected to said subscriber's cable through a first S interface circuit having an ISDN S interface capability, and outputs two data channels of a transfer speed 64 kbps multiplexed by a pair of said multiplexers to said subscriber's cable; and a demultiplexing means connected to said subscriber's cable through said first S interface circuit having an ISDN S interface capability to input two data channels of a transfer speed 64 kbps, containing a pair of demultiplexers for demultiplexing one of said two data channels of a transfer speed 64 kbps into two data channels of a transfer speed 32 kbps by each of said demultiplexers, and outputs four data channels of a transfer speed 32 kbps demultiplexed by a pair of said demultiplexers as the down stream data to said mobile devices; and said switching device, comprising;

a demultiplexing means connected to said subscriber's cable through a second S interface circuit having an ISDN S interface capability to input two data channels of the up stream data from said base station of a transfer speed 64 kbps, containing a pair of demultiplexers for demultiplexing one of said two data channels of a transfer speed 64 kbps into two data channels of a transfer speed 32 kbps by each of said demultiplexers, and outputs four data channels of a transfer speed 32 kbps demultiplexed by a pair of said demultiplexers; and a multiplexing means containing a pair of multiplexers for multiplexing two data channels of a transfer speed 32 kbps into one data channel of a transfer speed 64 kbps by each of said multiplexers, connected to said subscriber's cable through said second S interface circuit having an ISDN S interface capability, and outputs two data channels of a transfer speed 64 kbps multiplexed by a pair of said multiplexers to said subscriber's cable as the down stream data to said base station.

Said switching device in the invention further comprising;

a PCM switching section for switching a data of a transfer speed 64 kbps and outputs the data to a public fixed communication network;

a terminal device switching section for switching a data of a transfer speed 32 kbps and outputs data to said multiplexing means;

a plurality of first PCM converters for converting data transfer speed of 32 kbps to 64 kbps and connected to the input side terminals of said PCM switching section;

a plurality of second PCM converter for converting data transfer speed of 64 kbps to 32 kbps and connected to the input side terminals of said terminal device switching section; and a plurality of switches for distributing a data of transfer speed 32 kbps from said demultiplexing means to either of said PCM switching section through said first PCM converters or said terminal device switching section.

Said switching device in another invention further comprising;

a PCM switching section for switching a data of a transfer speed 64 kbps and outputs the data;

a plurality of first PCM converters for converting data transfer speed of 32 kbps from said demultiplexing means to data transfer speed 64 kbps, and connected to the input side terminals of said PCM switching section;

a plurality of second PCM converters connected to the output side terminals of said PCM switching section, and converting data transfer speed of 64 kbps from said switching section to data transfer speed of 32 kbps to output the data to said multiplexing means.

Japanese Patent Application Laid Open No. Sho-63-215132 discloses a system of multiplexing process of a low speed packet call by adding an attachment type additional device to the conventional device. However, according to the invention, it constitutes a digital communication system using a new device construction.

The invention provides a capability of using an ordinary 2B+D basic rate access interface as 4B'+D in way that 32 kbps data are twice multiplexed to 64 kbps circuit. Thus, in the PHS system using 4 channels of 32 kbps ADPCM for a base station as a base for the radio zone, only one circuit of 4B'+D (the same as the ordinary 2B+D) may preferably be prepared in connection between the base station and the switching center (the ISDN network).

It is unnecessary to convert into 64 kbps PCM in the base station, then the PCM converters converting between 32 kbps ADPCM and 64 kbps PCM are not required to be provided in the base station. This enables a further miniaturization of the base station equipment. In the digital radio system such as the PHS system which requires at least several thousands of base station equipment, the miniaturization of the base station equipment provides reduction of the amount of construction work and decreased construction expenses.

In addition to the above, even if the half rate or quarter rate of the radio channel is adopted in the future, it can be realized to make the B' channel half or quarter flexibly by adding small size of hardware modules and software changes in the base station. Therefore, the increase of the speech channels can always be realized only by one basic rate access interface line of 2B+D, and additional cable installation between the base station and the switching center is not required. Thereby, an effective utilization of the existing cables are provided.

BRIEF DESCRIPTION OF THE DRAWING

The present invention will be described in further detail with reference to the accompanying drawings, in which.

DETAILED DESCRIPTION OF THE PREFERRED EMBODIMENT

Figure 4:
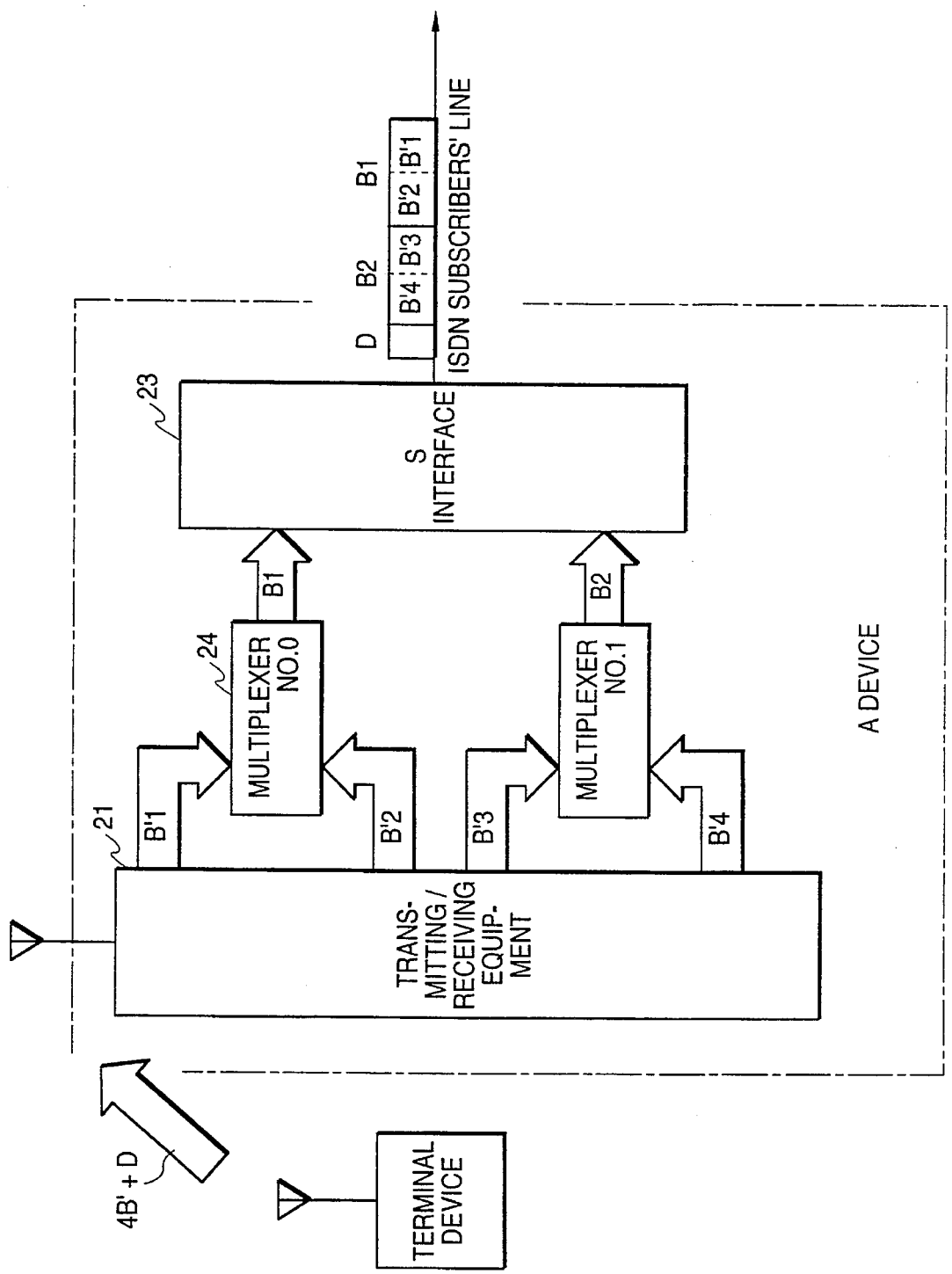
FIG. 4 is a conceptual view of block diagram of a multiplexer according to the invention.
Figure 5:
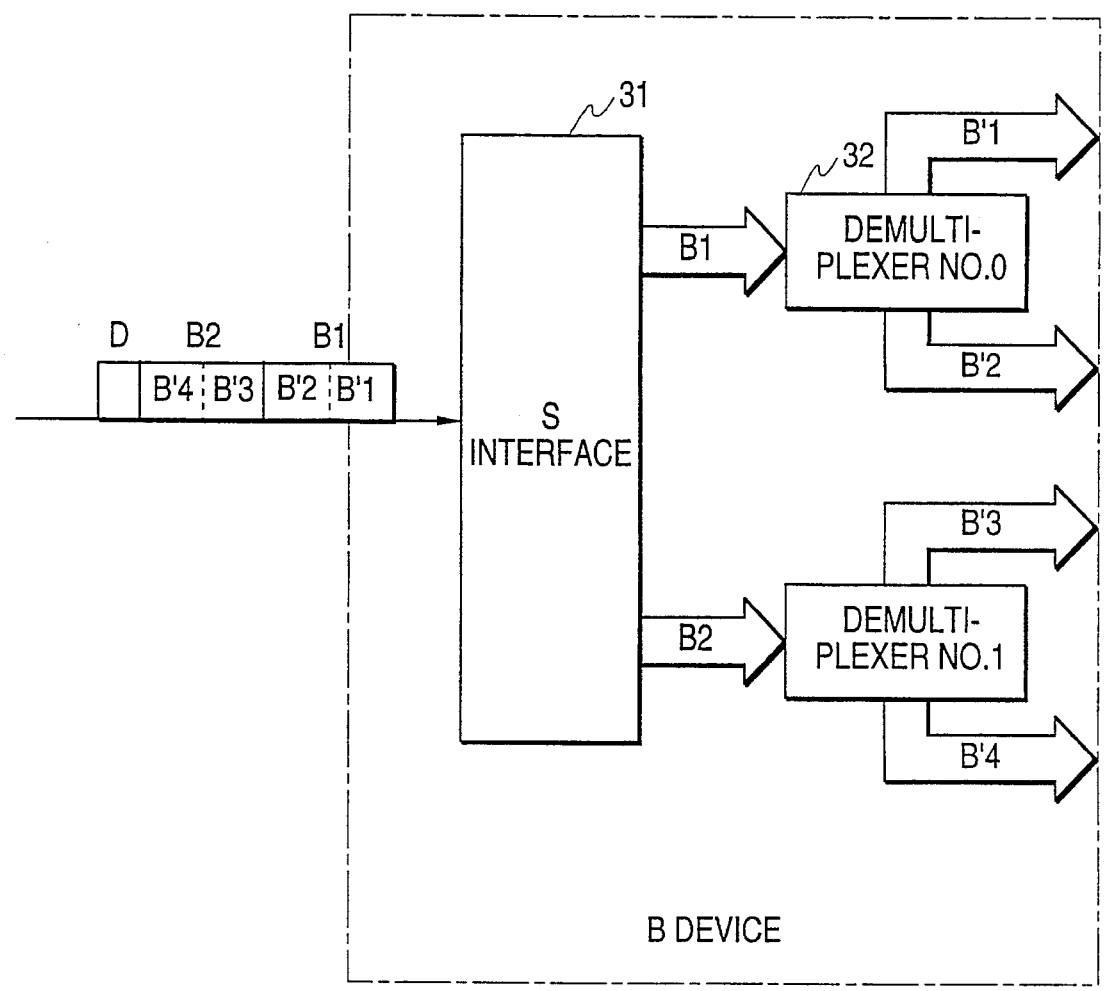
FIG. 5 is a conceptual view of block diagram of a demultiplexer according to the invention.

The first embodiment of the present invention is described referring to FIGS. 4 and 5. FIG. 4 is a conceptual view of a multiplexer and FIG. 5 is a conceptual view of a demultiplexer. An entire structure of a digital communication system is shown in FIG. 1.

The invention is to provide a digital communication system, its configuration is characterized by comprising; an ISDN network transmission line including two B type channels of a transfer speed 64 kbps, multiplexers 24 (multiplexer No. 0 and No. 1) as a multiplexing means for multiplexing four speech channels of a transfer speed 32 kbps is provided on one end of the transmission line, and demultiplexers 32 (demultiplexer No. 0 and No. 1) as a demultiplexing means for demultiplexing into four a speech channel of a transfer speed 32 kbps is provided on another end of the transmission line, the multiplexers 24 having a means in which the two B channels are respectively separated into two and two among the four speech channels are multiplexed into thus two divided B channels respectively, the demultiplexers 32 having a means in which the four speech channels are obtained by separating each two from among the two B channels respectively.

The speech channel of transfer speed 32 kbps transfers an ADPCM signal.

Figure 1:
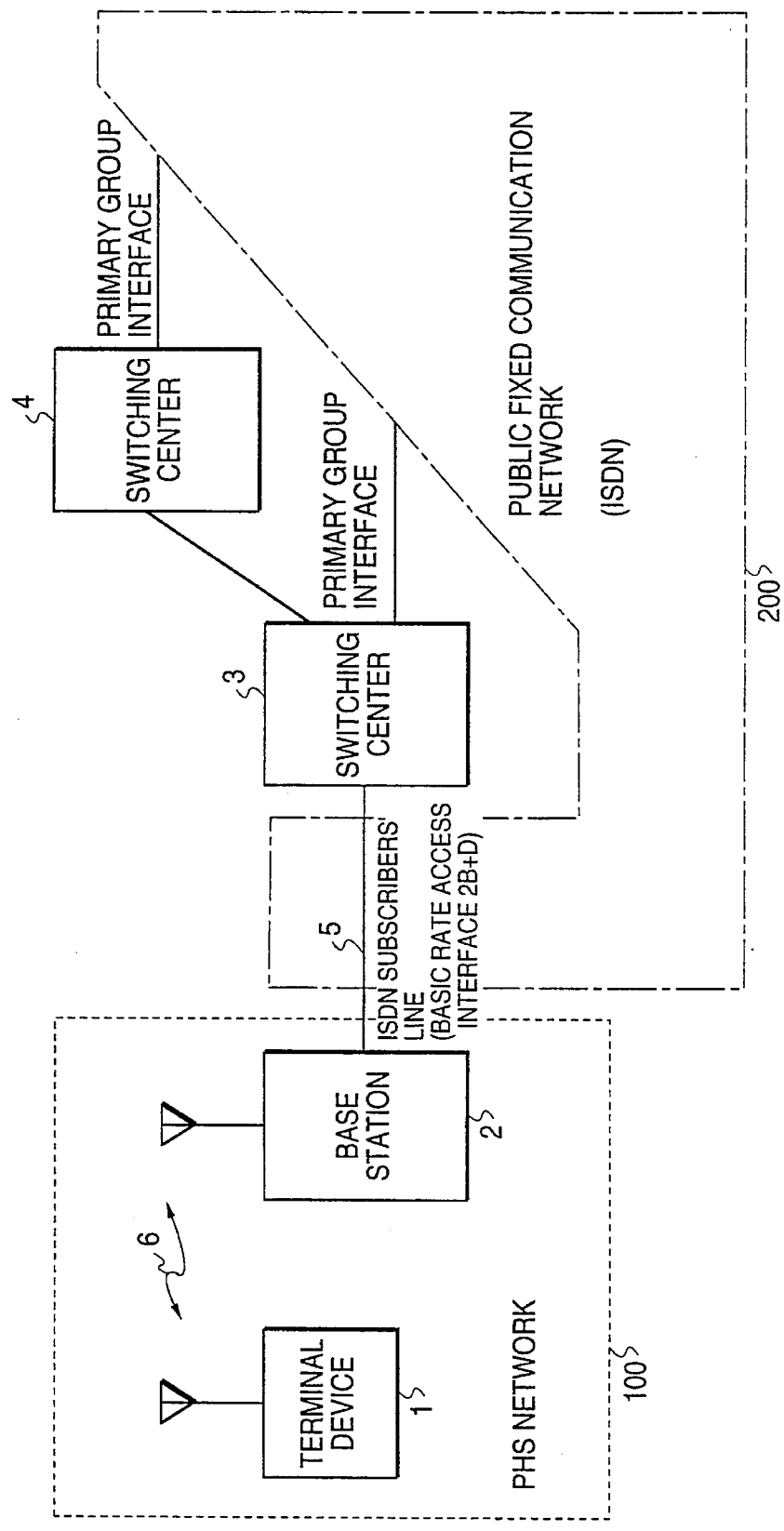
FIG. 1 is a connection diagram showing the connection of a PHS system network and a public fixed communication network formed by ISDN.
Figure 2:
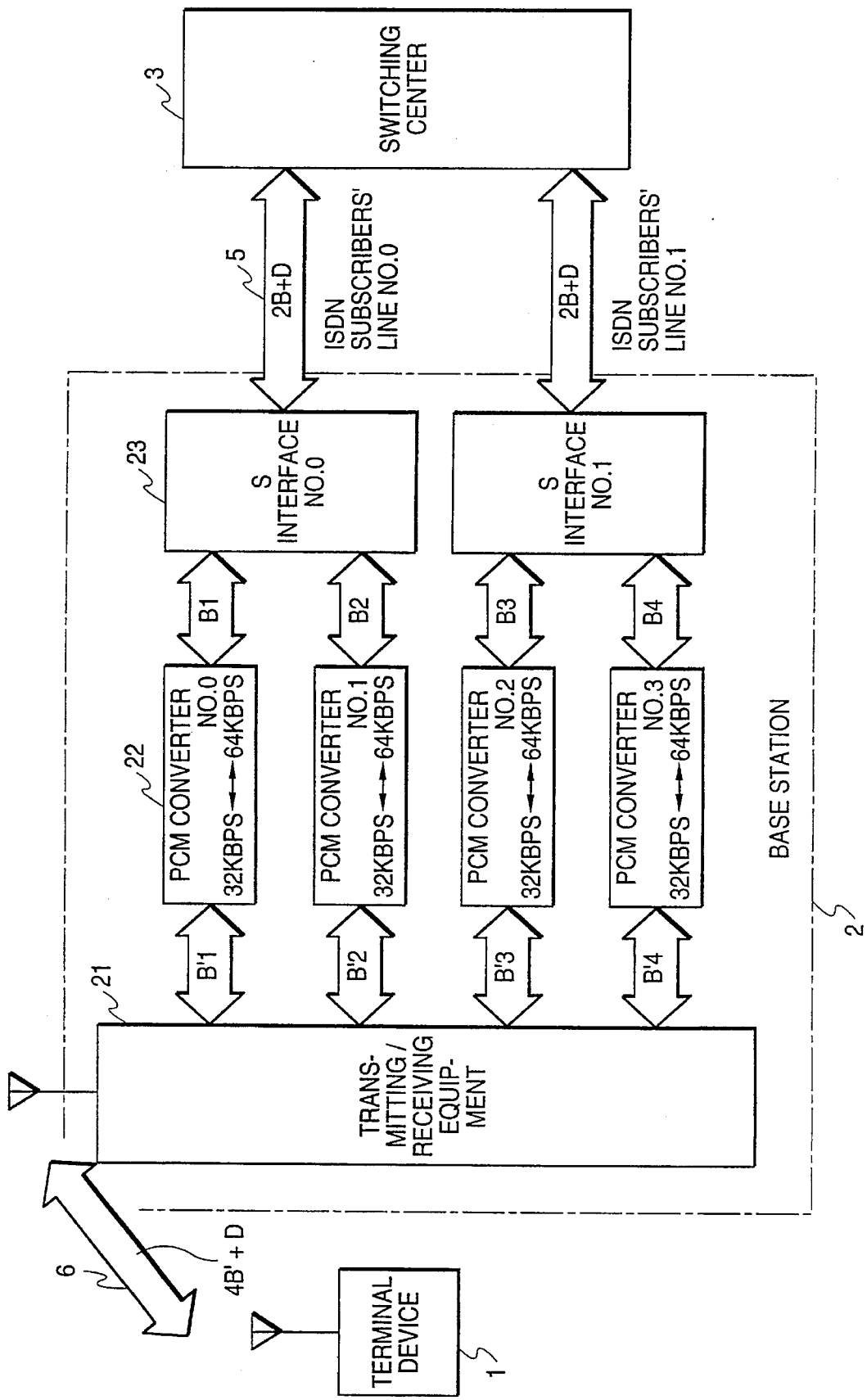
FIG. 2 is an illustrative view for showing operation of a base station of the prior art.
Figure 3:
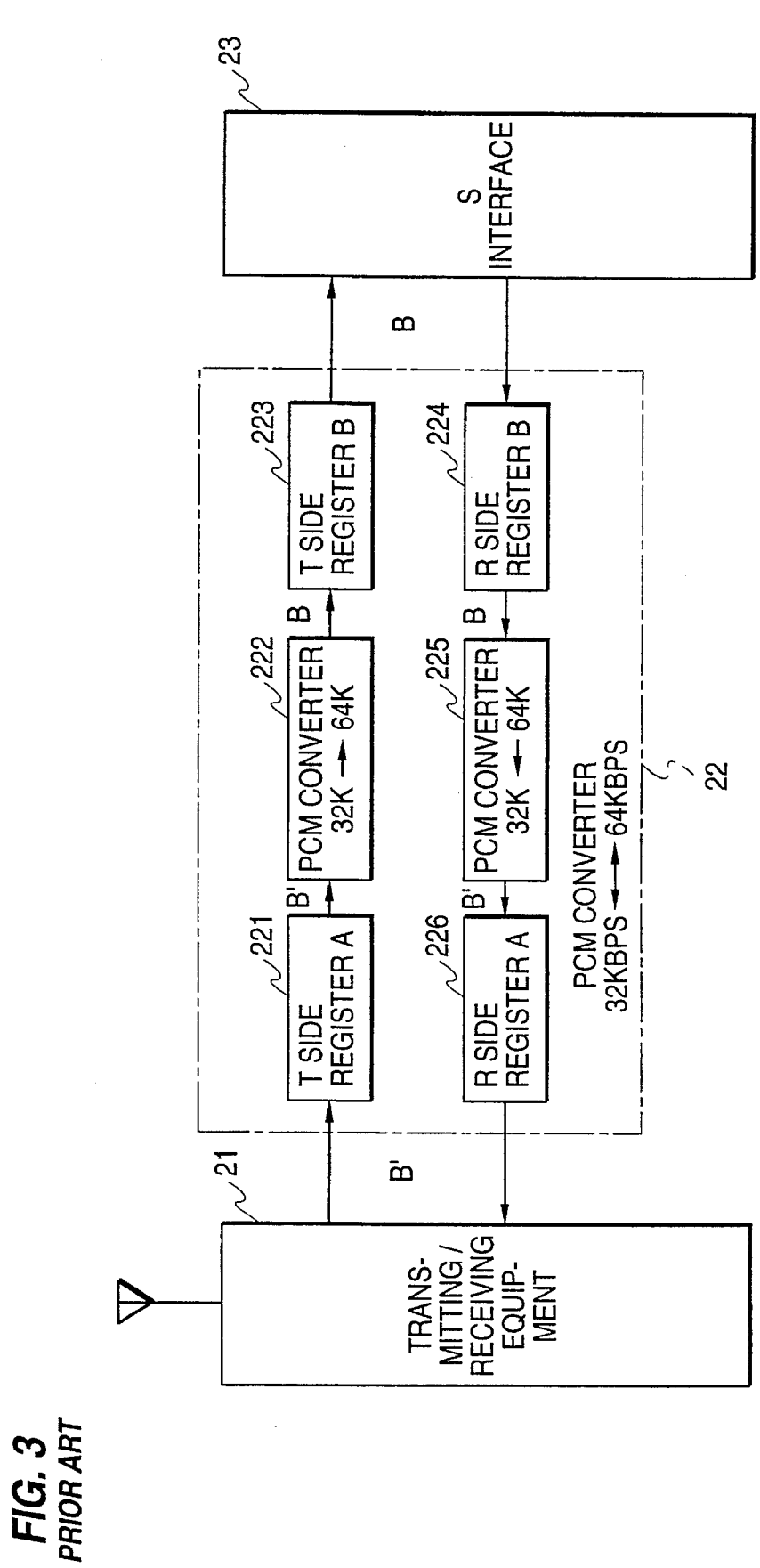
FIG. 3 is a detailed block diagram showing a part of FIG. 2.

In FIG. 1, there are provided a base station 2, a terminal device 1 as a mobile station connected to the base station 2 by radio channels, and a switching center 3 is connected to the base station 2 by the ISDN subscriber's line 5 having basic rate access interface (2B+D). A circuit between a terminal device 1 and the switching center 3 through the base station 2 is an ISDN circuit (a basic rate access interface of a user-network interface), the multiplexers 24 and the demultiplexers 31 are provided in both of the base station 2 and the switching center 3, and further the switching center 3 is connected to a public fixed communication network of ISDN through transmission cables having a primary rate access interface.

Figure 6:
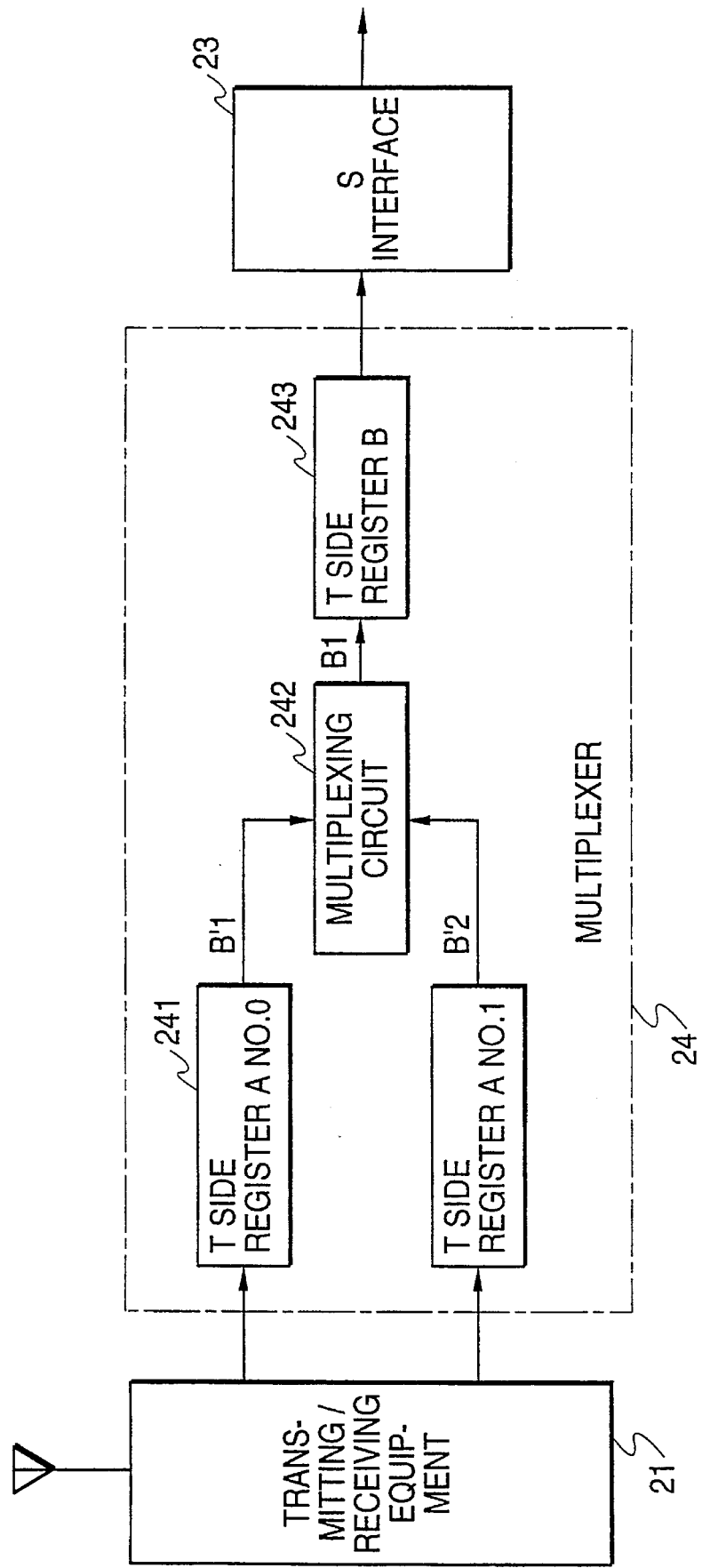
FIG. 6 is a detailed block diagram showing a part of FIG. 4.
Figure 7:
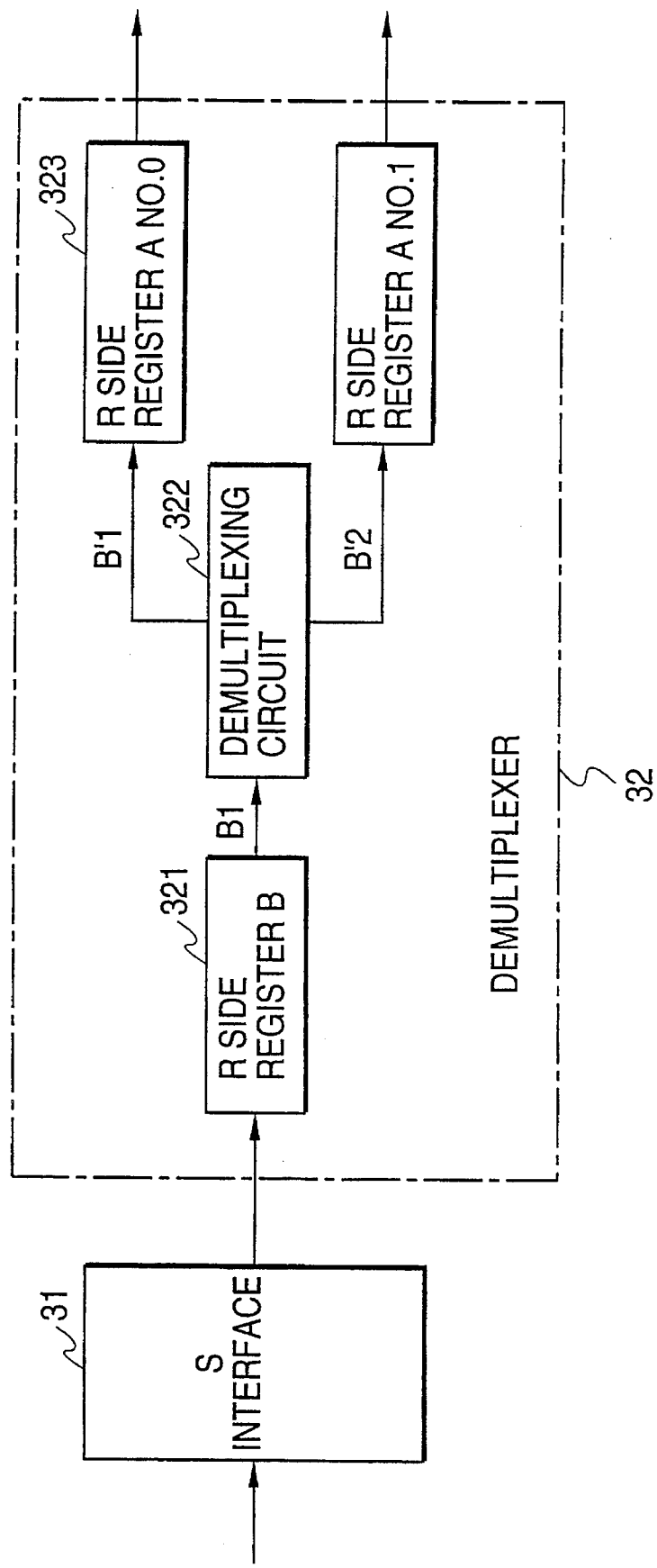
FIG. 7 is a detailed block diagram showing a part of FIG. 5.

FIG. 4 shows an A device which contains the multiplexers for the data flowing from the terminal device 1 to the switching center 3 and provided in the base station 2, and FIG. 5 shows a B device which contains the demultiplexers for the same data stream and provided in the switching center 3. More detailed configuration of each of the multiplexers 24 and the demultiplexers 31 is shown in FIG. 6 and FIG. 7, respectively. In an A device of FIG. 4, each of the multiplexers 24 is configured as shown in FIG. 6 and the T side registers A 241 for storing the up-stream channel data of 32 kbps are so arranged to provide the register pair, i.e., a pair of the T side registers A No. 0 and No. 1. Each 32 kbps data in two channels is stored in each of the pair of registers, and is multiplexed into 64 kbps data by a multiplexing circuit 242 and transferred to a T side register B for outputting from the multiplexer. Therefore, two pairs of the T side registers are provided in the A device and 32 kbps data in four channels of the up-stream is multiplexed into 64 kbps data in two channels.

Assuming that B'1 to B'4 represent the up-stream 32 kbps data transmitted from the terminal device 1 through the transmitting/receiving equipment 21, then B'1 and B'2 are multiplexed into 64 kbps data B1 for a B1 channel by the multiplexer No. 0, and B'3 and B'4 are multiplexed into 64 kbps data B2 for a B2 channel by the multiplexer No. 1.

The data B1 and B2 are sent to the ISDN subscriber's line having the basic rate access interface of 2B+D through the S interface 23. At this instant, 2B+D circuit is to be used as 4B'+D (B' is data of 32 kbps).

In a B device of FIG. 5, each of the demultiplexers 32 is configured as shown in FIG. 7, and the R side register B 321 is provided to store one B channel data (64 kbps data) which has arrived through the ISDN subscriber's line 5 and the S interface 31 and contains two 32 kbps data (2B': B'1 and B'2, or B'3 and B'4). The B channel data stored in the R side register B 321 is demultiplexed into two 32 kbps data by a demultiplexing circuit 322 and each of 32 kbps data (B') is stored into the R side registers A 323 (the R side register A No. 0 and the R side register A No. 1). Therefore, one each of the demultiplexers 32 functions to input one B channel (64 kbps data) and to output two B' channels (32 kbps data), and the B device totally inputs two B channels (2B) and outputs four B' channels (4B'). This means that the T side registers A 241 of the A device can perform communication with the R side registers A 323 of the B device using a transfer speed of 32 kbps. The demultiplexers the same as in the B device is provided in the A device, the multiplexer the same as in the A device is provided in the B device, and thus a bidirectional communication can be performed.

Figure 8:
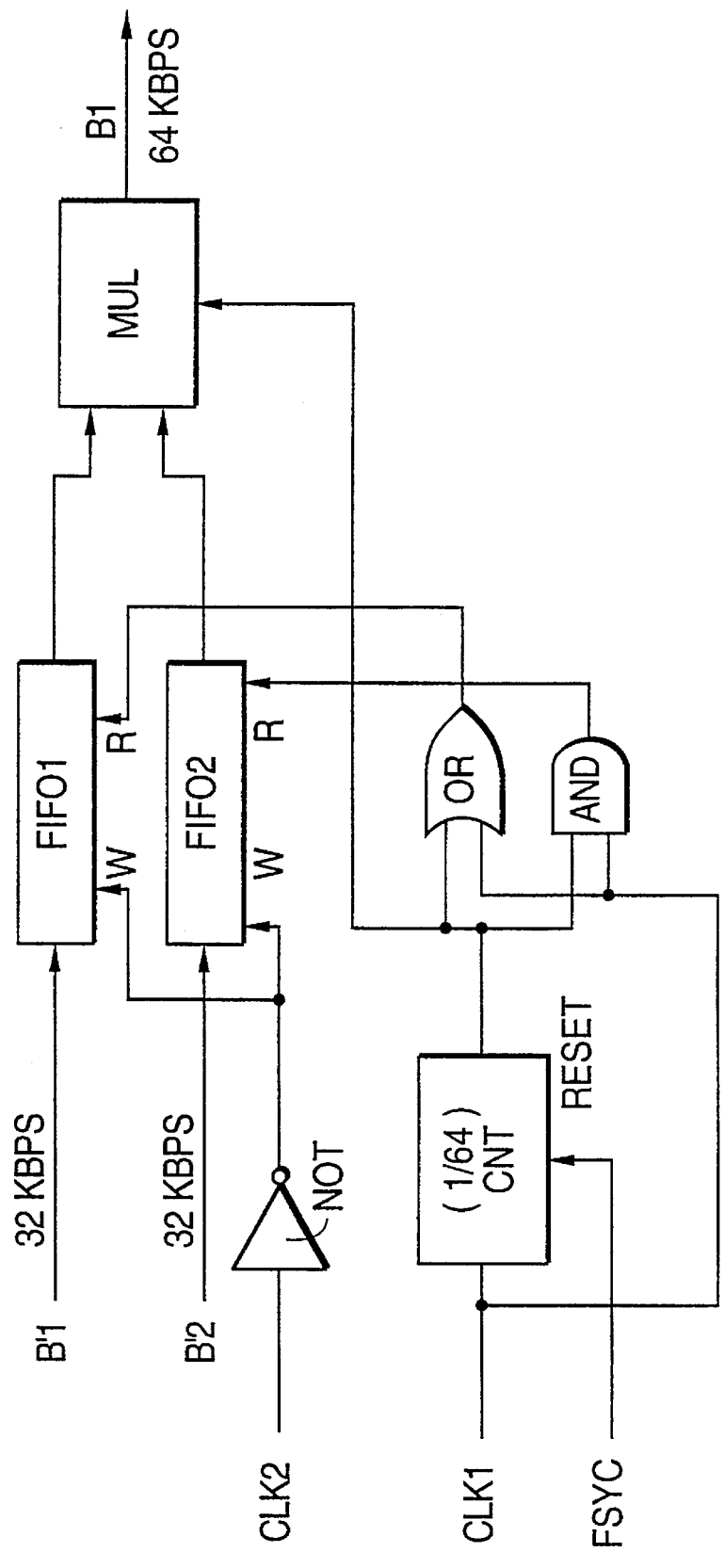
FIG. 8 is a detailed block diagram of a multiplexer showen in FIG. 6 according to the invention.

Next, the operation of the multiplexing circuit 242 according to the invention is described referring to FIG. 8, which is a block diagram of the multiplexing circuit 242 shown in FIG. 6. Respective 32 kbps data of B'1 and B'2 are input into memories FIFO1 and FIFO2 which are FIFO (first-in-first-out) memories by using a clock signal CLK2. A clock signal CLK1 is input into a frequency divider CNT capable of 1/64 dividing, and when an output signal level of the frequency divider CNT is "LOW" the data B'1 is synchronized with a clock signal produced by an OR circuit, and is read from the memory FIFO1, and is output through multiplexer MUL. When an output signal level of the frequency divider CNT is "HIGH" then the data B'2 is synchronized with a clock signal produced by an AND circuit, and read from the memory FIFO2, and is output through the multiplexer MUL. A head of each frame can be confirmed in that the frequency divider CNT is reset by a frame synchronization clock signal FSYC. Thus, this circuit construction converts two data B'1 and B'2 of 32 kbps into one set of 64 kbps data B1.

Figure 9:
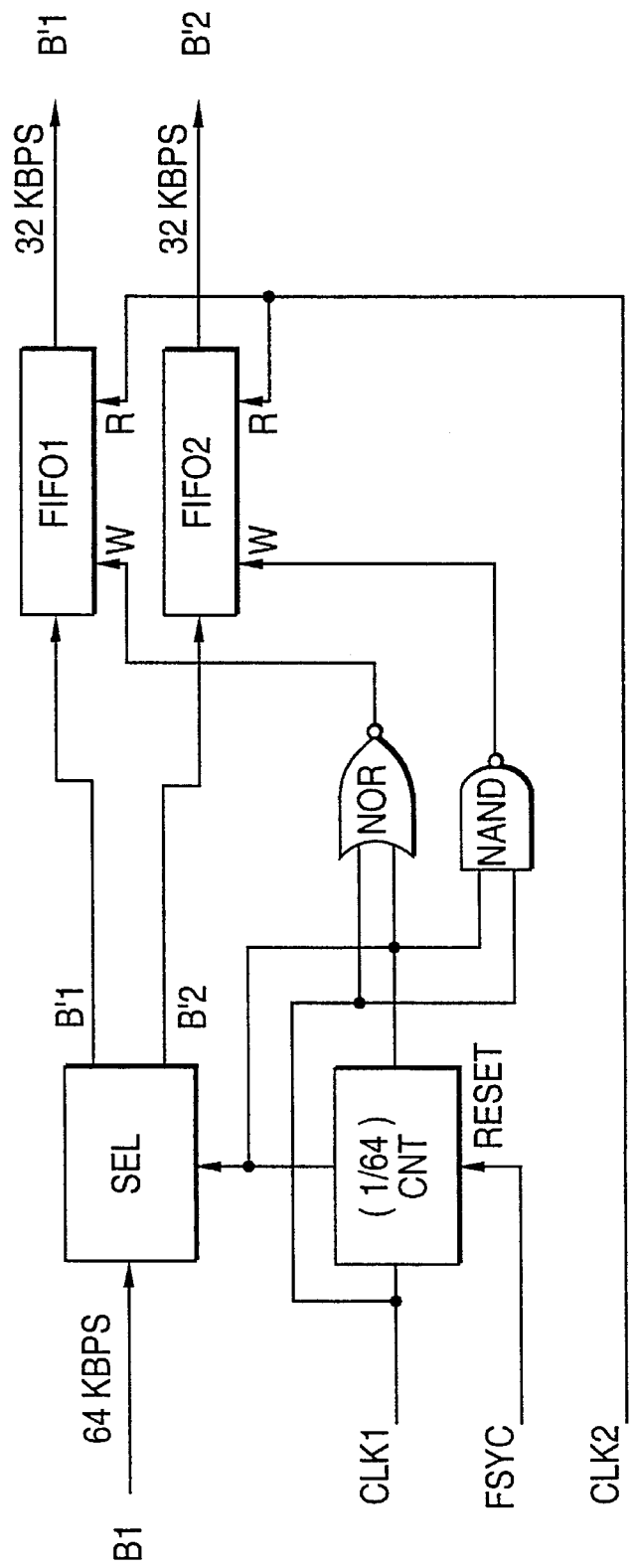
FIG. 9 is a detailed block diagram of a demultiplexer showen in FIG. 7 according to the invention.

The operation of the demultiplexing circuit according to the invention is described referring to FIG. 9, which is a block diagram of the demultiplexing circuit 322 shown in FIG. 7. In the multiplexed 64 kbps data B1, when an output signal level of the frequency divider CNT, into which the clock signal CLK1 is input, is "LOW", 64 kbps first half data B'1 is selected by a selector SEL, and synchronized with a clock signal produced by a NOR circuit, and is input into the memory FIFO1.

When an output signal level of the frequency divider CNT is HIGH, the 64 kbps remained half data B'2 is selected by the selector SEL, and synchronized with a clock signal produced by a NAND circuit, and is input into the memory FIFO2. Thereafter, synchronized with the clock signal CLK2, each memory FIFO1 or FIFO2 is output 32 kbps data B'1 and B'2. A head of respective data B'1 and B'2 can be confirmed in that the frequency divider CNT is reset by the same frame synchronization clock signal FSYC.

Figure 10:
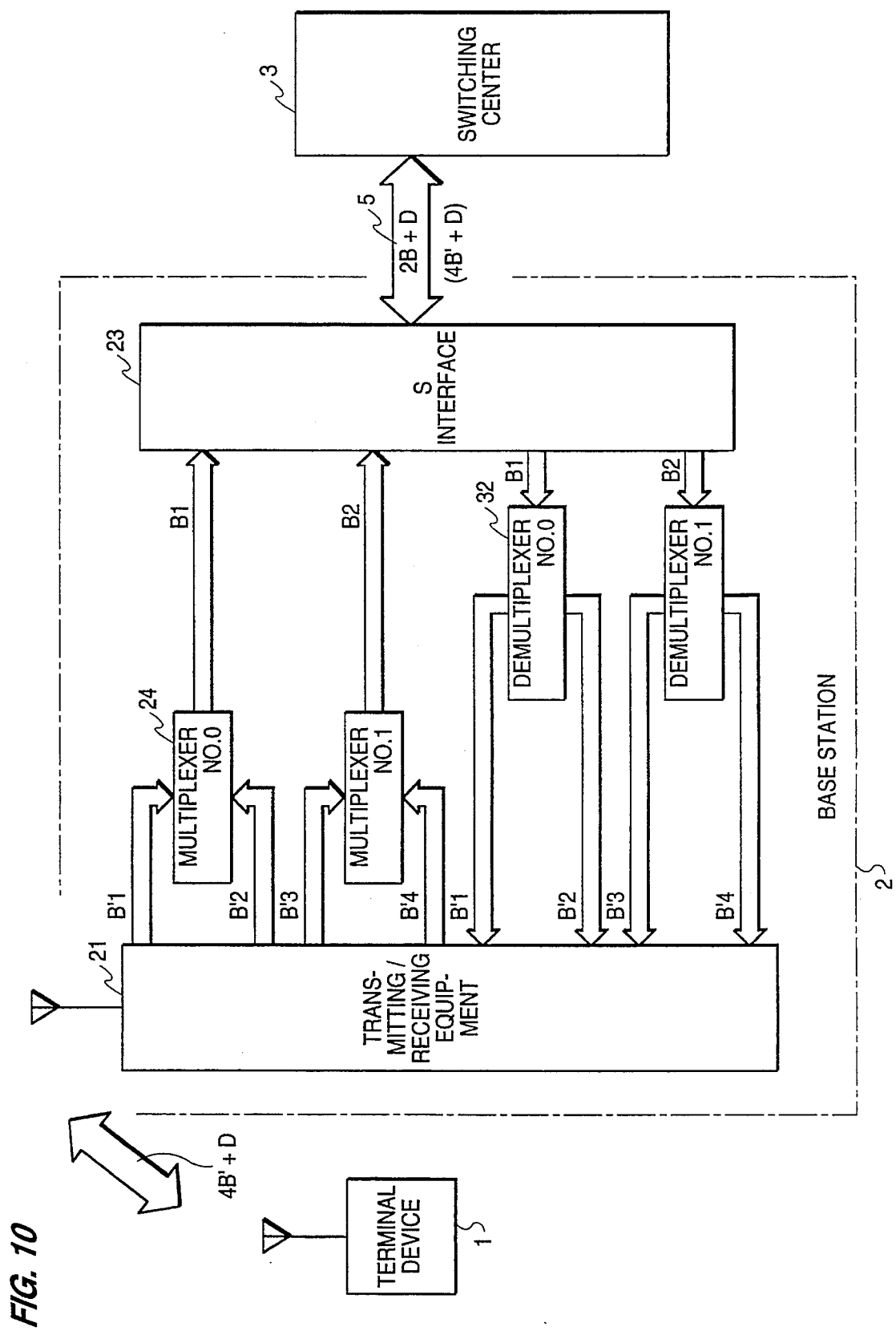
FIG. 10 is an illustrative view showing operation of a base station used in a first embodiment of the invention.

Operation of the base station of the first embodiment according to the invention is described referring to FIG. 10, which is a block diagram of the base station 2 used in the first embodiment of the invention. See FIG. 1 for a connection status of the PHS system network and the ISDN public fixed communication network. In FIG. 10, the base station 2 receives one B' data (32 kbps) from the terminal device 1 via a radio channel. Other terminal devices not show here can also use the other three radio channels. Those four B' data are multiplexed into two B data (64 kbps) by each of multiplexers 24 (e.g. B'1 and B'2 are multiplexed into B1 by the multiplexer No. 0, B'3 and B'4 are multiplexed into B2 by the multiplexer No. 1), and are fed to the ISDN subscriber's line 5 by the (2B+D) form through the S interface 23. For data of the (2B+D) form on the ISDN subscriber's line 5 from the switching center 3, each of B data (64 kbps) is fed into each of the demultiplexers 32, and demultiplexed into two sets of two B' data (32 kbps). That is, the demultiplexer No. 0 demultiplexes the B1 data into the B'1 and B'2 data, and the demultiplexer No. 1 demultiplexes the B2 data into the B'3 and B'4 data. Thus connection of both directions from the terminal device 1 to the switching center 3 and from the switching center 3 to the terminal device 1 is achieved.

The switching center 3 and the switching center 4 in FIG. 1 have the circuit switching functions between the circuits 4B'+D each other and between the 4B'+D circuit and the 2B+D circuit. Further, it has a switching function between the same and the 2B+D, thus the device is allowed to have a speech coder-decoder (codec).

Figure 11:
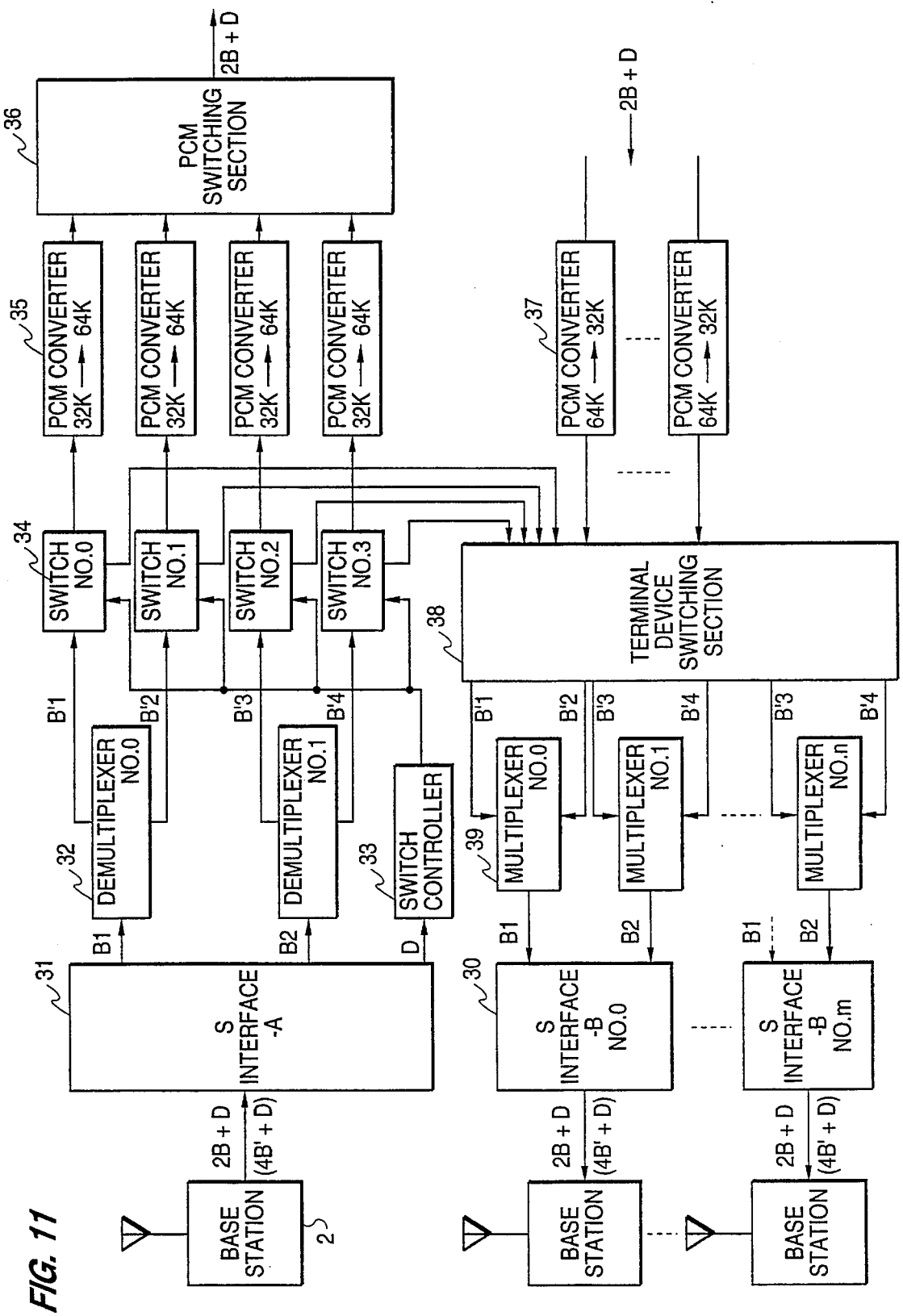
FIG. 11 is a block diagram of a switching center according to the invention.

The switching centers 3 and 4 of the first embodiment according to the invention are described referring to FIG. 11, which shows a block diagram of those switching centers. B'1 to B'4, and D data from the PHS system network of the 4B'+D circuit are transferred to the switching center by the (2B+D) form, and each of the B data (64 kbps) is demultiplexed into two B' data (32 kbps) by each of the demultiplexers 32 and fed to the switches 34 (the switch No. 0 to the switch No. 3). The D channel data is transferred into the switching controller 33 which analyzes a dial number contained for determining whether a destination of the call is a terminal device in the PHS system network or the other terminal device in the public fixed communication network.

In case where the destination of the call is the terminal device in the PHS system network, necessary switch No. 0 to No. 3 is switched, and the B' data is delivered to a terminal device switching section 38 while leaving it as 32 kbps. In the terminal device switching section 38, the data to be routed to the same destination (the same base station) is made a set, and multiplexed by one of the multiplexers 39, and fed to the base station through the ISDN subscriber's line as 2B+D (4B'+D).

When the destination of the call is the terminal device in the public fixed communication network, then by switching those required from among the switches SW1 to SW4, the data are delivered to the PCM converters 35 which convert the 32 kbps ADPCM to the 64 kbps PCM. The data converted into the 64 kbps PCM is transferred a PCM switching section 36, and switched to the required destination.

When the 64 kbps PCM data from the ISDN network is input through primary group interfaces, the data is converted into the 32 kbps ADPCM data by the PCM converters 37, and the converted 32 kbps data is delivered to the terminal device switching section 38 to be routed to the required base station. Those data which are to be routed to the same destination is made a set, and multiplexed by the multiplexers 39 and sent to the required base station through the ISDN subscriber's line as 2B+D (4B'+D).

Figure 12:
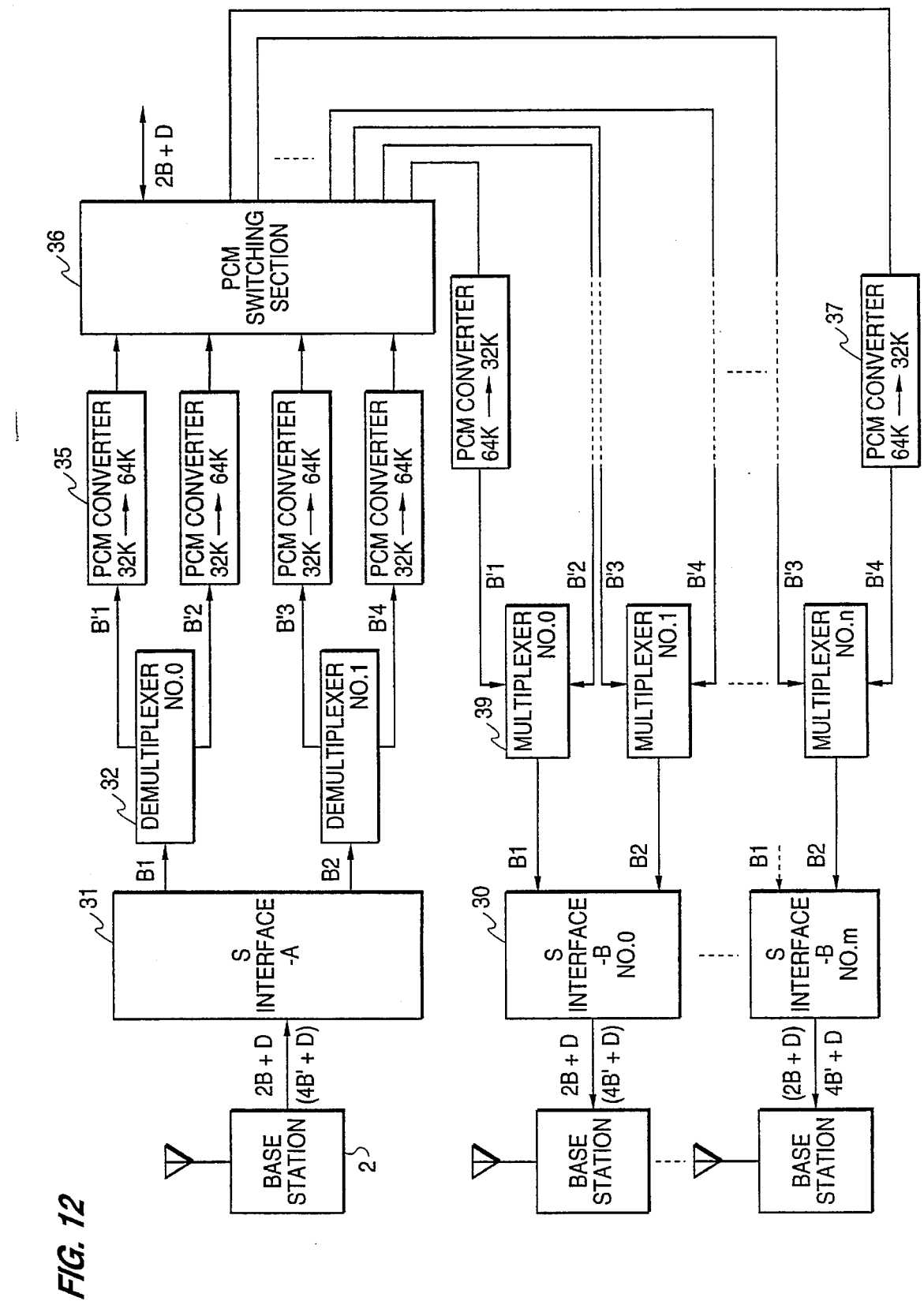
FIG. 12 is a block diagram of a switching center used in a second embodiment of the invention.

The second embodiment according to the invention is described referring to FIG. 12, which is a block diagram of the switching center 3 and 4. The 32 kbps data B'1 to B'4 input from the PHS system network of 4B'+D circuit are all delivered to the PCM converters 35 after having demultiplexed by the demultiplexers 32. Those data are converted from the 32 kbps ADPCM to the 64 kbps PCM and are dealt with as ordinary ISDN data to be switched and connected into the ISDN network or into the PHS system network by the PCM switching section 36. The switched data to be connected to the ISDN network are fed to the primary group of interface circuit.

The switched data to be connected to the PHS system network are passed to the multiplexers 39 through the PCM converters 37 which convert the 64 kbps PCM data to the 32 kbps ADPCM data, and after having multiplexed by the multiplexer 39 data are fed to the PHS system network.

The first embodiment according to the invention is suitable for the case where the large amount of calls are performed among the terminal devices in the PHS system network each other. The second embodiment according to the invention is suitable for the case where the large amount of calls are connected between the terminal devices of the PHS system network and the public fixed communication network.

In effect, as hereinbefore fully described, according to the invention, it is possible that the data in the amount corresponding to four channels of 32 kbps is possible to be transmitted by using two B channels of the ISDN subscriber's line interface, without conversion of the transfer mode. From this reason, a requirement of upgrading to a half rate or a quarter rate of the radio channel in the future can be realized by rendering the B' channels ½ or ¼, flexibly being coped with by additionally providing the hardware modules and by changing the software. As the increase of speech channels can always be realized only by one line of the basic rate access interface circuit of 2B+D, additional cable installation is not required. The structure of equipments and devices in the base station can be simplified because a conversion circuit of the transfer mode is unnecessary. A smaller scaled base station can be provided.

Although the present invention has been fully described by way of the preferred embodiments thereof with reference to the accompanying drawings, various changes and modifications will be apparent to those having skill in this field. Therefore, unless these changes and modifications otherwise depart from the scope of the present invention, they should be construed as included therein.

What is claimed is:

1. A digital communication system for converting a certain data transfer speed to a different data transfer speed, comprising:

a subscriber's cable having a basic rate access interface capability of an ISDN user-network interface in which two B type channels of a transfer speed 64 kbps are contained;

multiplexing means including,
a first S interface circuit having an ISDN S interface capability, said first S interface circuit being connected to one end of said subscriber's cable;
a pair of multiplexers, each multiplexing two input data channels of a transfer speed 32 kbps into one output data channel of a transfer speed 64 kbps being connected to said first S interface circuit, each multiplexer including,
a pair of first first-in-first-out memories each configured to input a different one of said two input data channels of a transfer speed 32 kbps; and
a multiplexing circuit multiplexing input data read out from each of said pair of first first-in-first-out memories alternatively by an interval of a half of speed 64 kbps, and outputting said multiplexed data of a transfer speed 64 kbps as one B type channel to said first S interface circuit; and demultiplexing means including,
a second S interface circuit having an ISDN S interface capability, said second S interface circuit being connected to another end of said subscriber's cable;
a pair of demultiplexers, each demultiplexing one input data channel of a transfer speed 64 kbps connected to said second S interface circuit into two output data channels of a transfer speed 32 kbps, each demultiplexer including,
a selecting circuit configured to selectively separate input data of one B type channel of transfer speed 64 kbps from said second S interface circuit into two output data channels having a former half of data of 64 kbps data stream and a latter half of data of 64 kbps data stream, respectively; and
a pair of second first-in-first-out memories each configured to input a different one of the two output data channels of said selecting circuit and outputting a data of transfer speed 32 kbps.

2. A digital communication system as claimed in claim 1, wherein a data channel of a transfer speed 32 kbps transfers an adaptive differential pulse code modulation (ADPCM) signals.

3. A digital communication system for converting a certain data transfer speed to a different data transfer speed, comprising;
a base station; a plurality of mobile terminal devices connected to said base station by radio channels of a transfer speed 32 kbps; and a switching device connected to said base station by a plurality of subscriber's cables having a basic rate access interface capability of an ISDN user-network interface in which two B type channels of a transfer speed 64 kbps are contained, wherein;

said base station, comprising;
a multiplexing means containing a pair of multiplexers for multiplexing two data channels of up stream data from said mobile terminal devices of a transfer speed 32 kbps into one data channel of a transfer speed 64 kbps by each of said multiplexers, connected to said subscriber's cable through a first S interface circuit having an ISDN S interface capability, and outputs two data channels of a transfer speed 64 kbps multiplexed by a pair of said multiplexers to said subscriber's cable; and
a demultiplexing means connected to said subscriber's cable through said first S interface circuit having an ISDN S interface capability to input two data channels of a transfer speed 64 kbps, containing a pair of demultiplexers for demultiplexing one of said two data channels of a transfer speed 64 kbps into two data channels of a transfer speed 32 kbps by each of said demultiplexers, and outputs four data channels of a transfer speed 32 kbps demultiplexed by a pair of said demultiplexers as down stream data to said mobile devices; and said switching device, comprising;
a demultiplexing means connected to said subscriber's cable through a second S interface circuit having an ISDN S interface capability to input two data channels of the up stream data from said base station of a transfer speed 64 kbps, containing a pair of demultiplexers for demultiplexing one of said two data channels of a transfer speed 64 kbps into two data channels of a transfer speed 32 kbps by each of said demultiplexers, and outputs four data channels of a transfer speed 32 kbps demultiplexed by a pair of said demultiplexers; and a multiplexing means containing a pair of multiplexers for multiplexing two data channels of a transfer speed 32 kbps into one data channel of a transfer speed 64 kbps by each of said multiplexers, connected to said subscriber's cable through said second S interface circuit having an ISDN S interface capability, and outputs two data channels of a transfer speed 64 kbps multiplexed by a pair of said multiplexers to said subscriber's cable as the down stream data to said base station.

4. Said switching device in a digital communication system for converting a data transfer speed to a different data transfer speed according to claim 3, further comprising;
a PCM switching section for switching a data of a transfer speed 64 kbps and outputs the data to a public fixed communication network;
a terminal device switching section for switching a data of a transfer speed 32 kbps and outputs data to said multiplexing means;
a plurality of first PCM converters for converting data transfer speed of 32 kbps to 64 kbps and connected to the input side terminals of said PCM switching section;
a plurality of second PCM converter for converting data transfer speed of 64 kbps to 32 kbps and connected to the input side terminals of said terminal device switching section; and
a plurality of switches for distributing a data of transfer speed 32 kbps from said demultiplexing means to either of said PCM switching section through said first PCM converters or said terminal device switching section.

5. Said switching device in a digital communication system for converting a data transfer speed to a different data transfer speed according to claim 3, further comprising;
a PCM switching section for switching a data of a transfer speed 64 kbps and outputs the data;
a plurality of first PCM converters for converting data transfer speed of 32 kbps from said demultiplexing means to data transfer speed 64 kbps, and connected to the input side terminals of said PCM switching section; and
a plurality of second PCM converters connected to the output side terminals of said PCM switching section, and converting data transfer speed of 64 kbps from said switching section to data transfer speed of 32 kbps to output the data to said multiplexing means.

\* \* \* \* \*